United States Patent [19]
Flieder

[11] Patent Number: 5,147,078
[45] Date of Patent: Sep. 15, 1992

[54] RETRACTABLE AUTOMOTIVE CLOTHESLINE

[76] Inventor: Joseph M. Flieder, 18426 Prairie Ave., Torrance, Calif. 90504

[21] Appl. No.: 439,153

[22] Filed: Nov. 20, 1989

[51] Int. Cl.$^5$ .............................................. B60R 7/10
[52] U.S. Cl. ........................... 224/42.46 A; 224/313; 211/119.12; 211/119.1; 242/100; 362/74; 223/89
[58] Field of Search ......... 224/313, 42.45 A, 42.46 A; 362/74, 427; 242/100; 248/353; 211/119.1, 119.15, 119.12; 223/89, 90, 94

[56] References Cited

U.S. PATENT DOCUMENTS

| | | | |
|---|---|---|---|
| 67,872 | 8/1867 | Griffin | 242/100 |
| 1,456,704 | 5/1923 | Medved | 242/100 |
| 1,777,784 | 10/1930 | Cole | 242/100 |
| 2,108,622 | 2/1938 | Strezoff | 223/89 |
| 2,617,571 | 11/1952 | Hart | 224/42.45 A |
| 2,629,528 | 2/1953 | Vealey | 224/313 |
| 2,846,079 | 8/1958 | Leeper | 224/313 |
| 2,910,186 | 10/1959 | Mobroten | 211/119.15 |
| 2,969,881 | 1/1961 | Lilly | 224/313 |
| 3,193,212 | 7/1965 | Lotta | 242/100 |
| 4,678,195 | 7/1987 | Trubiano | 223/89 |
| 4,711,409 | 12/1987 | Jones | 242/107.4 R |
| 4,770,384 | 9/1988 | Kuwazima et al. | 362/413 |

Primary Examiner—Linda J. Sholl
Attorney, Agent, or Firm—Leon Gilden

[57] ABSTRACT

A retractable automotive clothesline is set forth wherein a flexible line is biased in a normally retracted position interiorly of a cylindrical housing formed with a cylindrical outlet conduit. A first hook of a diameter greater than the outlet conduit is mounted on a forward terminal end of the line to prevent retraction of the line interiorly of the housing with a second hook pivotally mounted to the housing for securement between spaced hook members within an automotive interior upon opposed interior sides of the automotive interior. The clothesline includes spaced grooves therewithin for receiving hangers thereon and may optionally include captured hangers receivable within the grooves, wherein the hangers include an articulated framework for collapsing into a storage configuration prior to use. Further, the invention may utilize a flashlight member utilizing batteries therewithin and pivotally mounted to the housing to provide light in association with the flexible line during periods of limited light.

4 Claims, 4 Drawing Sheets

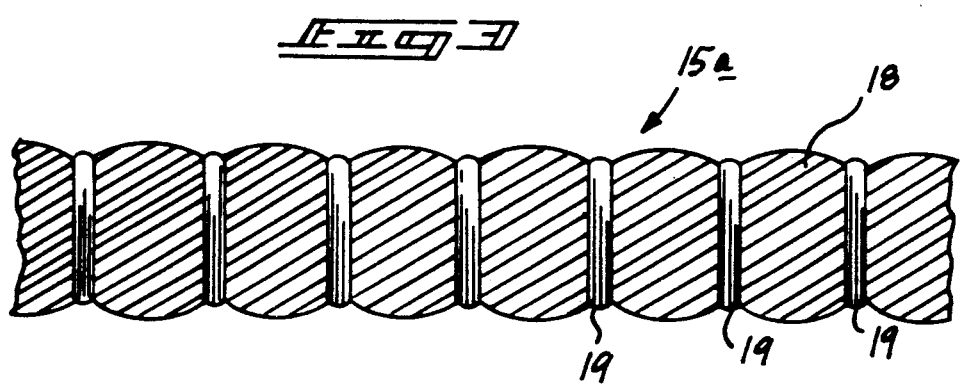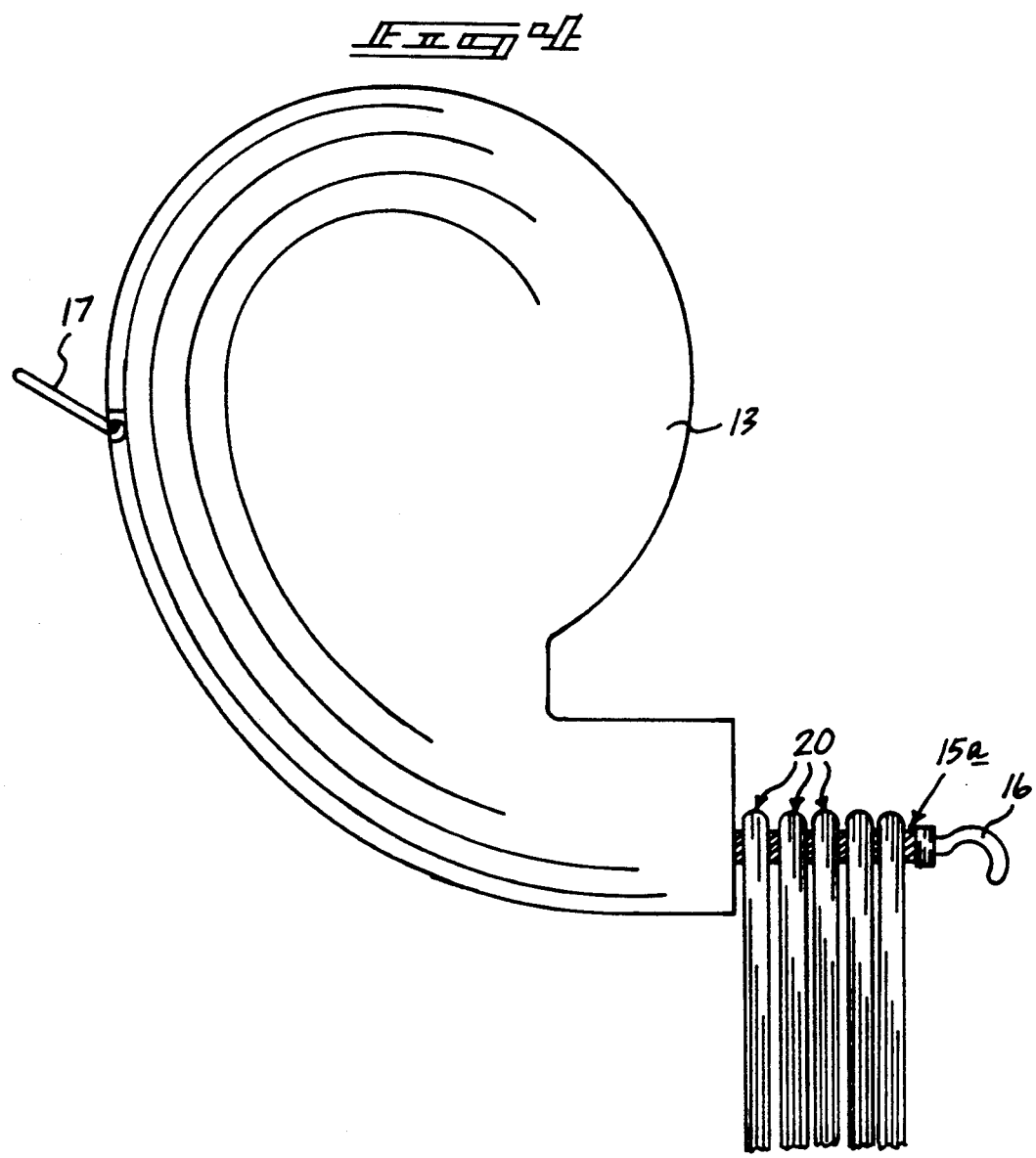

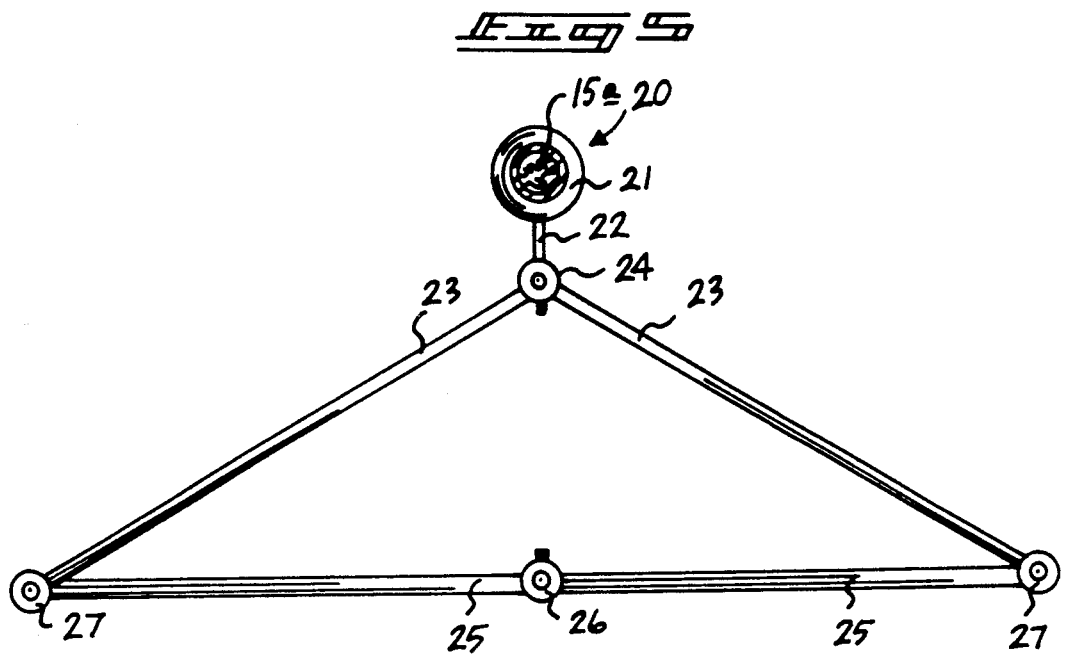

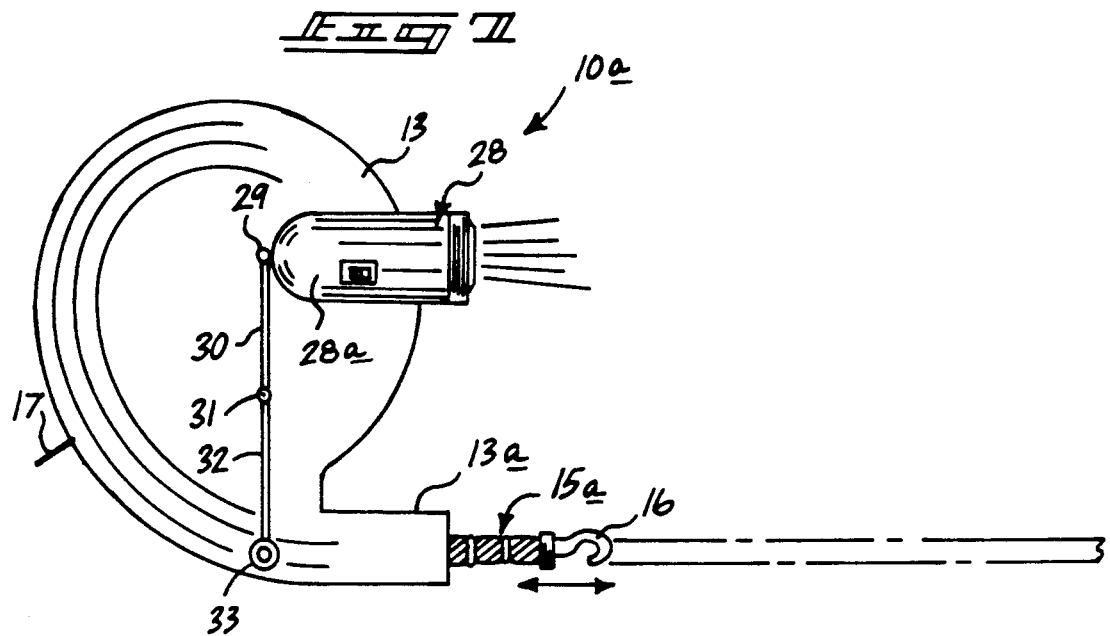
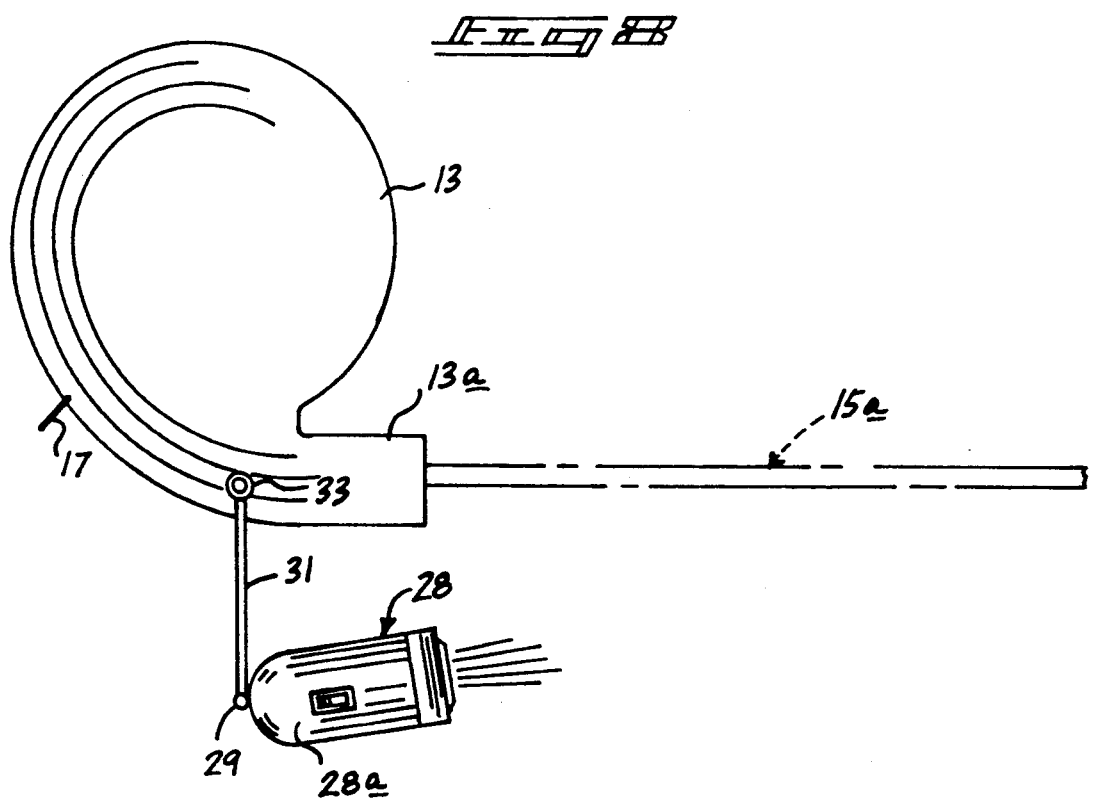

RETRACTABLE AUTOMOTIVE CLOTHESLINE

BACKGROUND OF THE INVENTION

1. Field of the Invention

The field of invention relates to retractable clotheslines, and more particularly pertains to a new and improved retractable automotive clothesline wherein the same is securable to an interior of an automobile to selectively provide a flexible clothesline for support of various garments thereon within the automobile.

2. Description of the Prior Art

The use of retractable clothesline of various configurations is known in the prior art. Heretofore, however, the clothesline organizations of the prior art have failed to provide a compact clothesline organization as contemplated by the instant invention to address particular characteristics of clothesline support within an automotive interior. Examples of the prior art include U.S. Pat. No. 2,629,528 illustrating the use of a chain-like member extensible across an automotive interior between two opposed sides thereof for support of clothes lacking the salient features of the instant invention directed to retractability of the line, providing grooved supports in the line for suspension of clothes hangers thereon, as well as a self-contained illuminating device.

U.S. Pat. No. 2,945,595 to Gardener provides a clothesline formed with a sleeve member to provide adjustment of the line between spaced supports.

U.S. Pat. No. 3,193,312 to Lotta sets forth a spring-loaded retractable clothesline member mounted within a wall for selective retraction of the clothesline therewithin.

U.S. Pat. No. 3,647,073 to Steiner sets forth an accessible clothesline with a spring action use for a wind-up retraction of the clothesline when not in use.

U.S. Pat. No. 4,684,076 to Stamper sets forth a retractable clothesline provided with a housing and a spring biasing means for retraction of the clothesline when not in use.

As such, it may be appreciated that there is a continuing need for a new and improved retractable automotive clothesline wherein the same addresses both the problems of efficiency of space in use and effectiveness in construction and in this respect, the present invention substantially fulfills this need.

SUMMARY OF THE INVENTION

In view of the foregoing disadvantages inherent in the known types of retractable clotheslines now present in the prior art, the present invention provides a retractable automotive clothesline wherein the same is selectively suspended between opposed support hooks mounted within an interior of a self-propelled vehicle for support of clothes therewithin to maintain the clothes in a preselected spaced orientation relative to one another. As such, the general purpose of the present invention, which will be described subsequently in greater detail, is to provide a new and improved retractable automotive clothesline which has all the advantages of the prior art retractable clotheslines and none of the disadvantages.

To attain this, the present invention includes a retractable automotive clothesline as set forth wherein a flexible line is biased in a normally retracted position interiorly of a cylindrical housing formed with a cylindrical outlet conduit. A first hook of a diameter greater than the outlet conduit is mounted on a forward terminal end of the line to prevent retraction of the line interiorly of the housing with a second hook pivotally mounted to the housing for securement between spaced hook members within an automotive interior upon opposed interior sides of the automotive interior. The clothesline includes spaced grooves therewithin for receiving hangers thereon and may optionally include captured hangers receivable within the grooves, wherein the hangers include an articulated framework for collapsing into a storage configuration prior to use. Further, the invention may utilize a flashlight member utilizing batteries therewithin and pivotally mounted to the housing to provide light in association with the flexible line during periods of limited light.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved retractable automotive clothesline which has all the advantages of the prior art retractable clotheslines and none of the disadvantages.

It is another object of the present invention to provide a new and improved retractable automotive clothesline which may be easily and efficiently manufactured and marketed.

It is a further object of the present invention to provide a new and improved retractable automotive clothesline which is of a durable and reliable construction.

An even further object of the present invention is to provide a new and improved retractable automotive clothesline which is susceptible of a low cost of manufacture with regard to both materials and labor, and which accordingly is then susceptible of low prices of sale to the consuming public, thereby making such retractable automotive clotheslines economically available to the buying public.

Still yet another object of the present invention is to provide a new and improved retractable automotive clothesline which provides in the apparatuses and methods of the prior art some of the advantages thereof, while simultaneously overcoming some of the disadvantages normally associated therewith.

Still another object of the present invention is to provide a new and improved retractable automotive clothesline wherein the same provides a spring-biased clothesline mounted within a housing wherein the housing and clothesline are selectively securable to opposed hook supports of an automotive interior with provision for maintaining clothes in a spaced orientation relative to one another in consequence of shifting and movement in use of the automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric sectional illustration of an improved clothesline utilized by the instant invention.

FIG. 4 is an orthographic view taken in elevation of the instant invention.

FIG. 5 is an orthographic frontal view of a clothes hanger utilized by the instant invention in combination with the clothesline.

FIG. 6 is an orthographic view taken in elevation of the hanger of FIG. 5 in a collapsed configuration.

FIG. 7 is an orthographic view taken in elevation of a modified retractable automotive clothesline of the instant invention.

FIG. 8 is a further orthographic view taken in elevation of a modified retractable automotive clothesline contemplated by the instant invention.

DESCRIPTION OF THE PREFERRED EMBODIMENT

Figure 1:
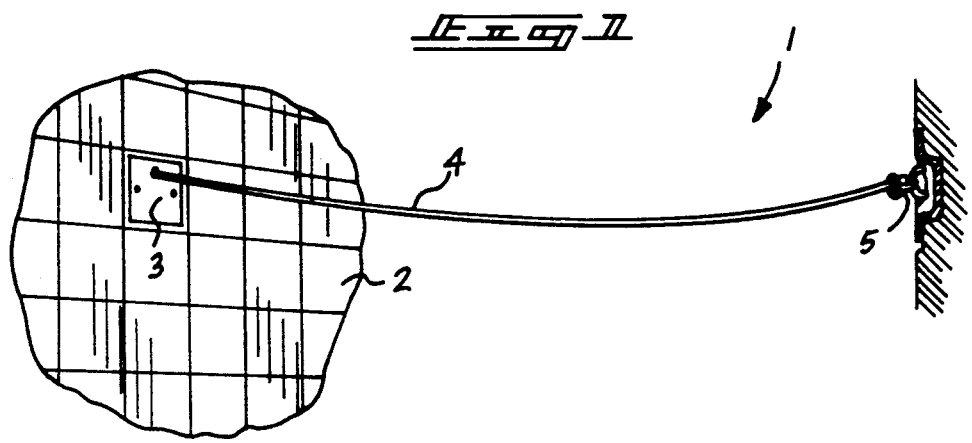
FIG. 1 is an isometric illustration of a prior art retractable clothesline.

With reference now to the drawings, and in particular to FIGS. 1 to 8 thereof, a new and improved retractable automotive clothesline embodying the principles and concepts of the present invention and generally designated by the reference numerals 10 and 10a will be described.

More specifically, the retractable automotive clothesline 10 of the instant invention sets forth an improvement over a typical prior art clothesline that is illustrated in FIG. 1, wherein a retractable clothesline 1 includes mounting within a wall 2, wherein a housing 3 includes a spring-biased retraction housing for retraction of a flexible clothesline 4 provided with a hook member 5 for securement to a remote end spaced wall surface. The retraction spring of the prior art, as typified in U.S. Pat. No. 3,193,312, is utilized in combination with a flexible line in a manner conventionally well known but incorporated herein by reference for ease of appreciation of a retraction device mounted within a housing.

Figure 2:
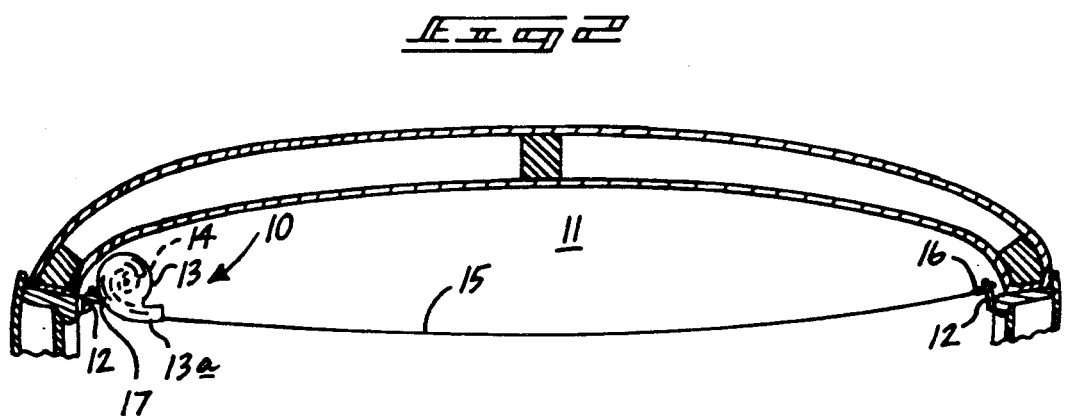
FIG. 2 is an orthographic view of the instant invention mounted within an interior of a typical automotive environment.

The retractable automotive clothesline 10, as illustrated in FIG. 2, is mountable within an automotive interior 11. The automotive interior includes spaced hook members 12 mounted within the automotive interior to spaced surfaces adjacent the roof line of the automobile to position the hook members 12 in an elevated orientation relative to the interior 11. The invention includes a cylindrical housing 13 including a cylindrical outlet guide 13a housing with flexible line 15 normally biased interiorly of the housing 13 by a retraction spring 14. It is noted that the outlet housing 13a is tangentially oriented relative to the housing 13. The line 15 includes a line hook 16 defined by a diameter greater than an outlet diameter of the outlet guide 13a to prevent withdrawal of a remote end of the line 15 interiorly of the housing. A housing hook 17 is pivotally mounted to the cylindrical housing 13 wherein the housing 17 is typically mounted to one of a plurality of hook members 12 with the line hook 16 extended and secured to the other of the pair of hook members to provide a clothesline 15 for suspension of various garments and the like interiorly of the automobile.

FIG. 3 is illustrative of a modified flexible line 15a that comprises a central flexible body 18 that includes encircling grooves 19 spaced at predetermined intervals along the central body 18, wherein the grooves 19 are of a diameter less than that of the central flexible body 18 to form abutments of the central body 18 between respective spaced grooves. The grooves enable securement and positioning of hangers mounted on the grooves for use in support of garments thereon avoiding the undesirable repositioning of clothes on the line as a consequence of automotive movement thereby maintaining a desired spacing of the various garments.

FIG. 4 is illustrative of captured clothes hangers 20 defined by a body of a diameter less than that or equal to the width of the grooves 19. The clothes hangers 20 includes a cylindrical head member 21 that defines an internal diameter equal to or greater than the main body 18 to allow positioning of the hangers about the line 15a. A support rod 22 extends downwardly from the head member 21 and is integrally affixed thereto and is mounted to a first pivot 24 at a lower end of the support rod 22. A plurality of top frame arms 23 are mounted to the first pivot 24 at first ends of the arms 23 and mounted to third pivots 27 at remote ends of the arms 23, with base arm members 25 mounted together by a second pivot 26 aligned with the first pivot 24, wherein the base arm members 25 form the base of an isosceles triangle in combination with the top frame arms 23. The first and second pivots 24 and 26 are locking pivots to enable a locking of the arms 23 and the arms 25 respectively during use, whereupon they may be collapsed into an aligned position, as illustrated in FIG. 6, for compactness of storage during periods of non-use.

FIGS. 7 and 8 illustrate a modified clothesline and arrangement 10a wherein a flashlight member 28 is mounted to the housing 13. The flashlight member 28 is defined by elongate cylindrical housing 28a that houses conventional batteries and a switch to actuate the flashlight as desired. The flashlight includes a first friction pivot 29 mounted at a rear end of the housing 28a wherein a first leg member 30 is mounted to the first friction pivot with a second friction pivot mounted to a remote end of the first leg member 30. A second leg member 32 is mounted at one end to the second friction pivot 31 and at its other end to a third friction pivot 33 to enable repositioning of the flashlight member 28 as desired relative to the housing and the clothesline 15a to direct an illumination light onto the clothesline to enhance use of the clothesline and the invention during periods of limited light availability. FIG. 8 illustrates the flashlight member 28 utilizing a single leg member 31 between spaced pivots.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retractable automotive clothesline apparatus for suspension between spaced hook members mounted on opposed sides of an automotive interior, the apparatus comprising, a housing including an outlet conduit defined by a predetermined diameter, wherein the conduit is in communication with an interior cavity of the housing, and an elongate flexible line wound within the housing, and a retraction means within said cavity of said housing for normally biasing the line interiorly of the housing, and a line hook mounted to a free end of the line for securement to one of said hook members, and a housing hook pivotally mounted to the housing for securement to a remaining hook member, and wherein the housing is defined by a cylindrical configuration and the outlet conduit is tangentially arranged relative to the cylindrical housing, and wherein the flexible line includes a main flexible body member, and further includes spaced encircling grooves formed at predetermined intervals along the main body member, and the encircling grooves are defined by a groove diameter less than that defined by a main body diameter of the main body member, and further including a plurality of hanger members captured and securable onto the flexible line, and the hanger members each are defined by an articulated framework, the articulated framework including a plurality of arm members, each arm member of a predetermined width equal to or less than a groove width defined by each encircling groove, and wherein each hanger member includes a cylindrical head member mounted about the flexible line about one of the plurality of encircling grooves, and a support rod integrally formed to the cylindrical head member, and a first pivot mounted to a further end of the support rod remote from the cylindrical head member, and a plurality of top frame arms mounted to the first pivot, and remote ends of the top frame arms remote from the first pivot mounted and integrally secured to a third pivot, each third pivot further including a base arm member mounted thereto, and each base arm member secured together by a second pivot, the second pivot underlying the first pivot.

2. A retractable automotive clothesline apparatus as set forth in claim 1 further including a flashlight member pivotally mounted to the housing.

3. A retractable automotive clothesline apparatus as set forth in claim 2 wherein the flashlight member includes a cylindrical body member, and the cylindrical body member including a first friction pivot formed to a rearwardmost end thereof, and a first leg member mounted to the first friction pivot, and the first leg member mounted to a second friction pivot remote from the first friction pivot, the second friction pivot mounted to the housing.

4. A retractable automotive clothesline apparatus as set forth in claim 3 further including a third friction pivot mounted medially of the first leg member.

* * * * *